No. 852,453. PATENTED MAY 7, 1907.
J. W. ROBERTS.
AXLE SETTING MACHINE.
APPLICATION FILED JULY 16, 1906.

Witnesses:
James M. Berryman
John D. Kelly

Inventor:
John Wm. Roberts

THE NORRIS PETERS CO., WASHINGTON, D. C.

UNITED STATES PATENT OFFICE.

JOHN WILLIAM ROBERTS, OF SAN ANGELO, TEXAS.

AXLE-SETTING MACHINE.

No. 852,453.      Specification of Letters Patent.      Patented May 7, 1907.

Application filed July 16, 1906. Serial No. 326,472.

*To all whom it may concern:*

Be it known that I, JOHN WILLIAM ROBERTS, a citizen of the United States, residing at San Angelo, in the county of Tom Green and State of Texas, have invented a new and useful Axle-Setting Machine, of which the following is a specification.

Figure 1:
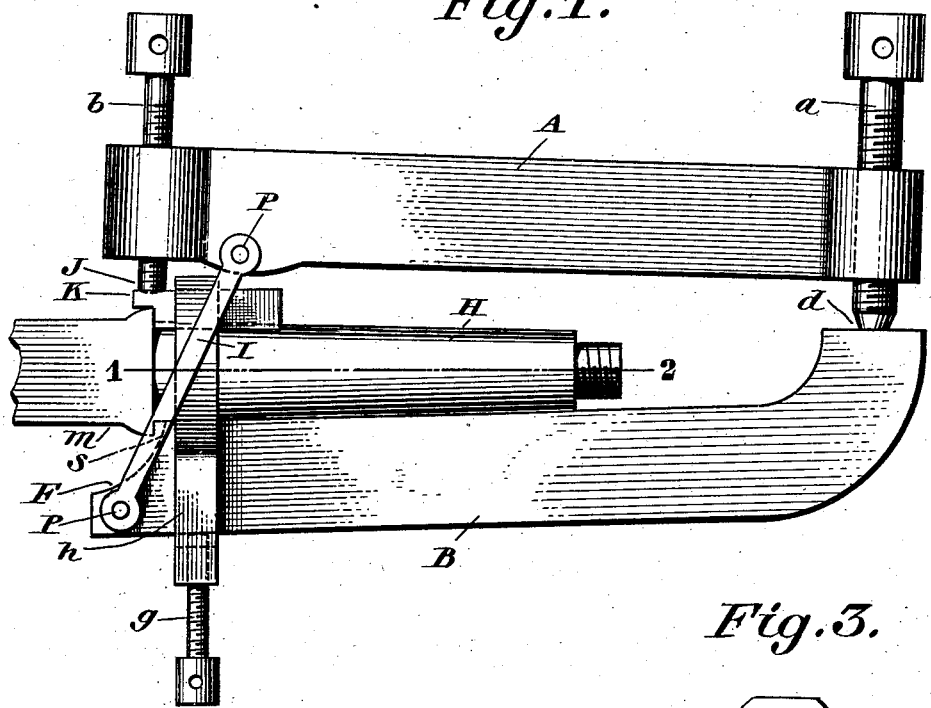
Figure 2:
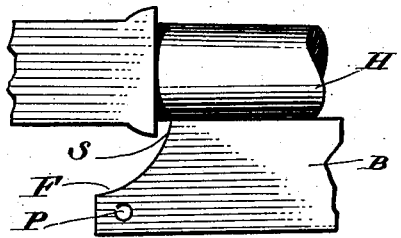
Figure 3:
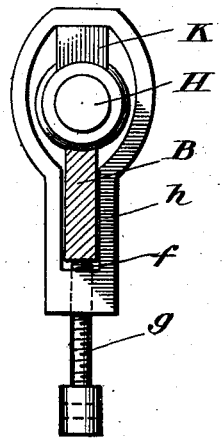

My invention relates to improvements in axle setting machines adapted to setting an axle intact or undetached from a vehicle, and the objects of my improvements are, first to afford a simple and easily adjusted device that can be operated on any style or shape of axle, second, a contrivance operating independent of utilizing the axle on vehicle for a lever or bearing on the inside of the collar of the axle, third, to provide a machine not coming in contact with any part of the vehicle gear inside of collar of axle. I attain these objects by the mechanism illustrated in the accompanying drawing in which Figure 1, is a vertical view of one side of the entire machine in position on axle which is a duplicate of the part or side not shown. Fig. 2, shows more clearly the shape of inner end of lever B, in position on the axle. Fig. 3, is a vertical right angle view to Fig. 1, looking on the line 1 2, Fig. 1, showing lever B, fulcrum block K, and axle H, held together by collar clamp h, Similar letters refer to similar parts throughout the several views.

The acting or power lever A, with power screw a, adjusting or fulcrum screw b, said lever A, is connected to a fixed lever B, by two links I, (one on each side of machine) with bolts or rivets at P P, Fixed lever B, is clamped solid to the axle H, by a collar clamp h, which prevents said lever B, moving or changing its position on the axle H, said lever B, being an extension of the axle arm H, on its outer end, Lever B, where it connects with link I, at P, has a beveled or sloping shape on its inside edge next to the axle; see F, Fig. 2, The purpose of having lever B, shaped like F, in Fig. 2, is to allow the end of lever B, at P, to move in toward axle when power is applied to lever B, at d, by means of power screw a, which when said power is applied forces the two levers A and B, apart at d, which also causes a pressure on fulcrum block K, at J, and also draws up on link I, at P P, thus forcing the end of lever B, at P, in toward the axle as the axle bends at m, Fulcrum collar clamp h, holds lever B, fulcrum block K, and axle H, rigidly and firmly together preventing fulcrum block K, from slipping on the axle; fulcrum block K, has a recess or pocket on its upper or outer surface to receive the end of adjusting or fulcrum screw b, at J, which holds the power lever A, from moving in a horizontal line, out or in on the axle The two levers A and B, are connected by two links I, one of said links on each side of levers A and B, one end of said links is connected to lever B, at its extreme inner end at P, and the other end of links I, are fastened to lever A, just inside of the adjusting or fulcrum screw b, causing the two links to have a slight angle to levers A. and B, when machine is in position to bend the axle inside of the collar at m; see Fig. 1;

When necessary to bend the axle outside of the collar of the axle on the wearing surface, lever B can be moved out toward the point of the axle H, until the point at S, Figs. 1. or 2. is over or a little outside of the place to be bent or straightened, leaving lever A to retain its former position, this will bring the two links I, to a more perpendicular or right angle position to levers A and B, Fulcrum or collar clamp h, see Fig. 3, which shows on the line 1 2, Fig. 1, has an adjusting or tightening screw g, on its lower side which bears against lever B, which holds fulcrum block K, and lever B, securely to axle H, and holds said fulcrum block K, and lever B, immovable on axle H, when operating the machine.

When power is applied by power screw a, to lever B, at d, it creates a pressure at J, on fulcrum block K, and also draws on and up on lever B, at P, through connecting links I, causing end of lever B, at P, to move in toward the axle inside of the collar at m.

I could accomplish the same results in operating this machine by placing fulcrum screw b, on the inside of the collar of the axle provided, there was a solid bearing for the fulcrum screw b, which is not always the case, as the upper surface of the axle is most always capped with wood, this would allow the two links I, to assume a right angle position to levers A and B, The fulcrum block K, could be dispensed with when the axle is to be set forward or back or up, if there is no clips or other obstructions to interfere with the bearing end of the adjusting screw b, by placing or moving power lever A, in toward the center of the axle until links I, were in a right angle to levers A and B, when said levers would not be inclined to want to move out or in on axle, as is the case when links I, are in the position shown in Fig. 1,

I claim:

An axle setting machine comprising the combination of two horizontal levers practically parallel to each other of a power screw in the outer end of the upper or power lever being adapted to act on the adjacent end of the lower or fixed lever, a fulcrum or adjusting screw in the inner end of said upper or power lever, one end of a pair of twin links being connected to the opposite sides of said upper or power lever close to said fulcrum or adjusting screw and the opposite ends of said twin links being fastened to the extreme inner end of said lower or fixed lever, a clamping collar that clasps said lower or fixed lever and a fulcrum block rigidly to the axle means for tightening said clamping collar, a pocket or recess in the upper surface of said fulcrum block being adapted to receive and retain the end of said fulcrum or adjusting screw.

JOHN WILLIAM ROBERTS.

Witnesses:
  Don C. Chamberlin,
  William M. Tolson.